Jan. 6, 1925.  1,521,692

H. LUSTIG

POWER HAND SAW

Filed Jan. 22, 1923  2 Sheets-Sheet 1

Inventor:
H. Lustig
by
[signature]
Att'y.

Jan. 6, 1925. 1,521,692
H. LUSTIG
POWER HAND SAW
Filed Jan. 22, 1923  2 Sheets-Sheet 2
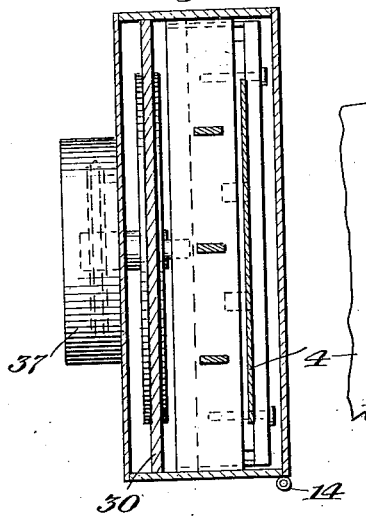
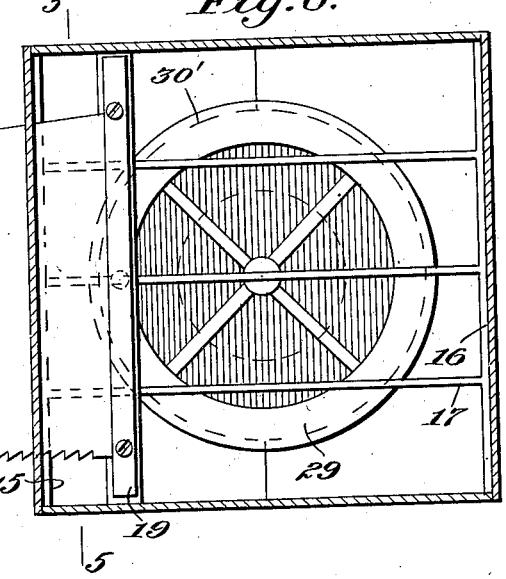
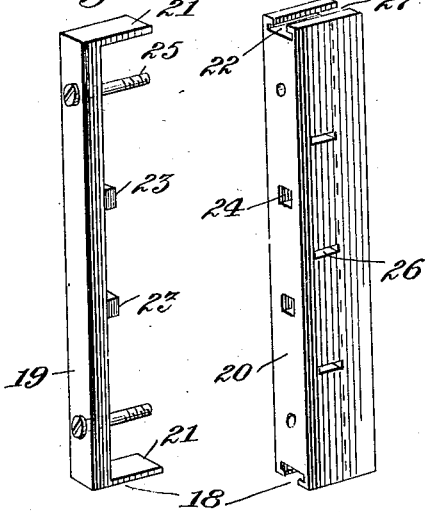
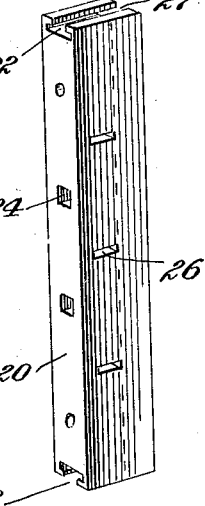
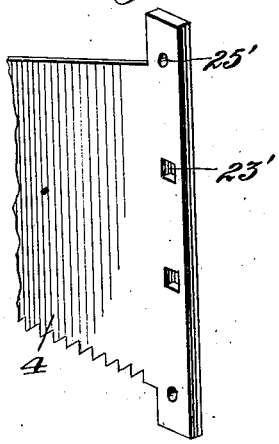
Inventor:
H. Lustig
by
E. F. Wenderoth
Att'y.

Patented Jan. 6, 1925.

1,521,692

UNITED STATES PATENT OFFICE.

HERBERT LUSTIG, OF YOUNGSTOWN, OHIO, ASSIGNOR TO JOSEPH J. LUSTIG, OF SARANAC LAKE, NEW YORK.

POWER HANDSAW.

Application filed January 22, 1923. Serial No. 614,240.

*To all whom it may concern:*

Be it known that I, HERBERT LUSTIG, a citizen of the United States, residing at 802 West Woodland Avenue, Youngstown, Ohio, have invented a new and useful Power Handsaw; and I do hereby declare the following to be a full, clear, and exact description of the same.

This invention relates to a power hand tool, and more particularly to a saw.

One of the principal objects of the invention is to provide a readily portable hand saw.

A further object is to provide a hand saw having a novel guide means for the saw holder.

Another object is to provide a hand saw having a novel power transmitting means.

A still further object is to provide a hand saw having an improved saw clamp or holding means.

Further objects are to simplify the construction, reduce the cost of manufacture, and increase the efficiency of devices of this character.

Other and further objects will appear in the following detailed description, reference being had to the accompanying figures of drawing, wherein;

Fig. 5 is a vertical section on line 5—5 of Fig. 6;

Fig. 6 is a side elevation of a portion of the device, parts being shown in section;

Figs. 7 and 8 are the two parts of the tool clamping member;

Fig. 9 is a perspective view of the butt end of the saw; and

Figure 1:
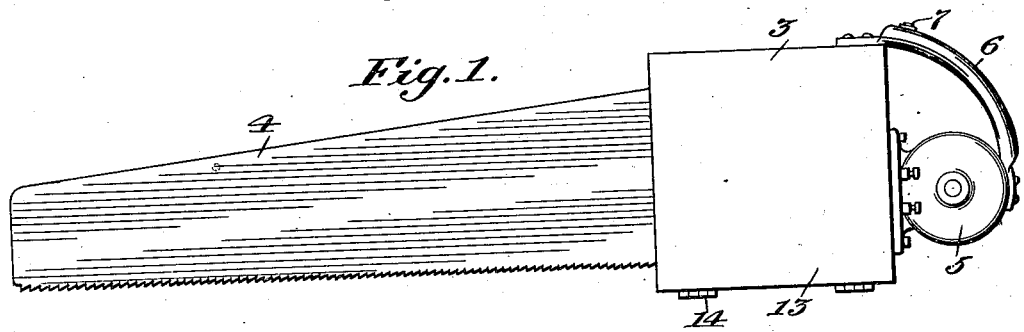
Fig. 1 is a side elevation of the complete device.
Figure 2:
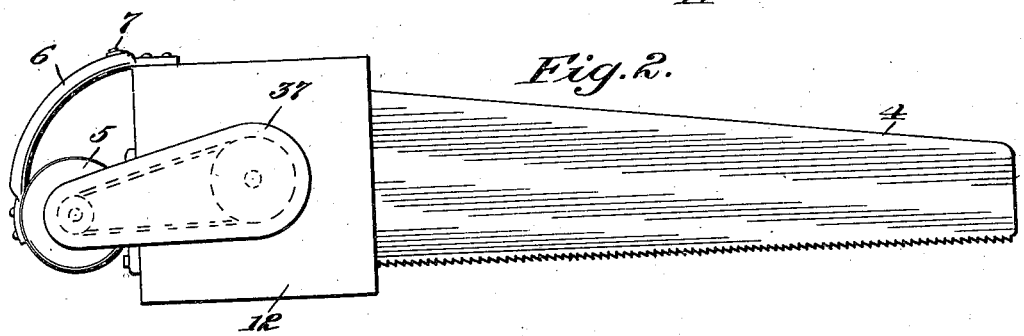
Fig. 2 is a side elevation from the side opposite to that shown in Fig. 1.
Figure 3:
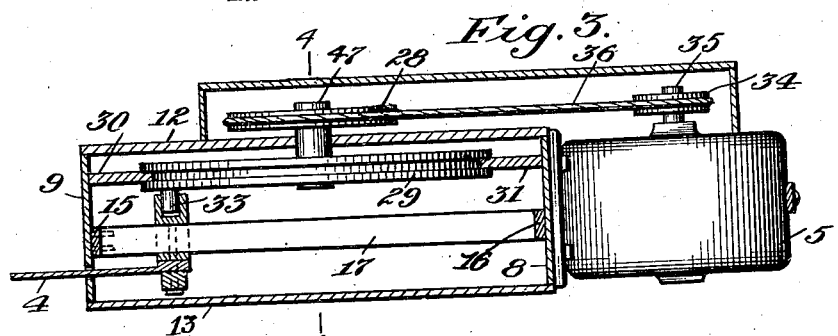
Fig. 3 is a plan view, parts being in section.
Figures 4, 10:
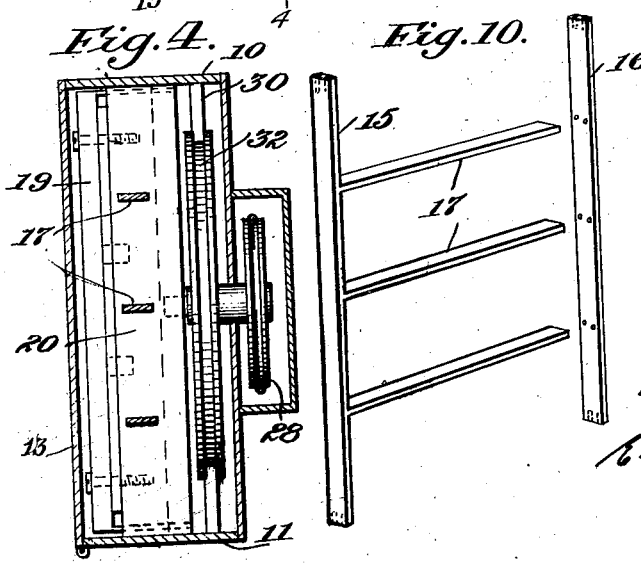
Fig. 4 is a vertical section on line 4—4 of Fig. 3, parts being shown in elevation.
Fig. 10 is a view of the saw clamp guide member.

The device comprises a casing 3 receiving a saw or other tool 4, and a prime mover, such as an electric motor 5, attached thereto by any appropriate means, such as 6 which serves as a carrying and operating handle for the tool, and carries conveniently arranged thereon, a starting button 7 for the motor 5.

The casing 1, includes four side members 8, 9, 10 and 11, and a back and front cover 12 and 13, respectively, the latter being connected to a side member by means of hinges 14.

Within the casing 1, is positioned a guide member having uprights 15 and 16, and cross-bar 17.

Positioned to slide upon the cross-bars 17 is a saw clamp designated generally as 18. The clamp comprises two relatively adjustable telescoping members, 19 and 20, the end portions 21, sliding in slots 22. Lugs 23, formed on 19, fit into corresponding sockets 24, in member 20. The two clamp members are drawn together, and held firmly in place by means of threaded bolts 25 carried by 19, and screwing into member 20. The saw or other suitable tool, having a butt end fitted with apertures for receiving bolts 25 and lugs 23, as shown at 23', 25' is firmly clamped between members 19 and 20, and is readily removed for repair, or replacement by a fresh tool.

Within the member 20, is a lengthwise groove 27, whereby the clamp member is actuated, as explained below.

Arranged in the clamp member 20, are slots 26 to receive the bars 17, whereby the clamp and attached tool is properly guided. The side member 9 of the casing 1 is furnished with a slot for the saw or other tool.

In the back cover 12 is journalled a shaft 47, carrying a driving wheel 28, on its outer end outside of the casing 1, and a driven wheel 29, on its inner end, and within the casing 3. Wheel 29 is guided and held true in its rotation by means of two members 30 and 31 closely fitting the casing 1, and having matching semicircular cutout portions 30', 31', which fit into a groove 32, around the entire periphery of wheel 29. In this manner, wheel or disc 29 is restrained to rotate about a center, without necessity for stub shaft 47 to have a second bearing.

Carried by wheel 29, is a wrist pin or crank 33, which fits within groove 27, and reciprocates therein on rotation of the wheel, thus imparting reciprocatory motion to the saw guide, which slides to and fro on the guides 17.

Wheel 28 is driven by means of a pulley 34 keyed to the shaft 35 of the motor. A rope drive 36 is shown for the sake of illustration, but obviously any other appropriate means can be used, and the invention is in no way limited to the particular means shown. Attached to cover 12 is a housing 37 for encasing the above-described driving mechanism.

The operation of the device which should now be apparent from the above detailed description is as follows. The operator grasps the handle 6, placing the tool in operating position, and presses button 7, starting the motor 5 which receives its energy from an external circuit, not shown in the drawing. The motor 5 rotates pulley 34 which rotates wheel 29 by means of driving wheel 28. The crank member 33 slides up and down in groove 27 and at the same time reciprocates the cross-head clamp member 18 on the guides 17 and with it the saw 4 or other tool.

It will be appreciated from the foregoing that the tool is readily replaceable and that the saw may be replaced by a file or like tool.

It is also clear that the guide bars, and the clamp member, rigidly restrain the operating tool to a reciprocatory motion and that guide members 30, 31, hold wheel 29 to run true and obviate the necessity of a through shaft in place of the stub shaft 47 as shown.

A single and preferred embodiment of the inventive concept, has been described and illustrated in the foregoing specification in order to comply with the patent statutes; but it is to be distinctly understood that this embodiment is set forth solely for the purpose of illustration and that the invention is in no way limited to the structure shown and described.

What I now claim as my invention is:—

1. A power hand tool comprising in combination a casing, a work tool, a reciprocable tool clamp located in the casing for receiving the end of the tool, a guide in the casing for the tool clamp, a prime mover, and power transmitting means for connecting the tool clamp and the prime mover, said guide comprising a plurality of guide bars supported at their ends by uprights, the guide being proportioned to fit snugly within the casing and the guide bars slidably receiving the tool clamp.

2. A power hand tool comprising in combination a casing, a work tool, a reciprocable tool clamp located in the casing for receiving the end of the tool, a guide in the casing for the tool clamp, a prime mover, and power transmitting means for connecting the tool clamp and the prime mover, said power transmitting means comprising a driven wheel within the casing and having an edge slot encircling its entire periphery and two semi-circularly recessed guides in the casing, the recesses matching to form a circular recess, the edge of which is received in said slot, whereby the driven wheel is held to rotate to a center.

3. A power hand tool comprising in combination a casing, a work tool, a reciprocable tool clamp located in the casing for receiving the end of the tool, a guide in the casing for the tool clamp, a prime mover, and power transmitting means for connecting the tool clamp and the prime mover, said power transmitting means comprising a driven wheel within the casing and having an edge slot encircling its entire periphery and two semi-circularly recessed guides in the casing, the recesses matching to form a circular recess, the edge of which is received in said slot, so that the driven wheel is held to rotate about a center, said wheel carrying a wrist pin which reciprocates in a groove in the tool clamp, a stub shaft journalled in a side of the casing and carrying the driven wheel on one end, the other end of the shaft carrying a driving wheel positioned outside of the casing, and said power transmitting means transferring energy from the prime mover to the driving wheel.

4. A power operated hand tool comprising a work tool, and means for reciprocating the same, such means for reciprocation comprising a cross-head clamping the tool end, a rotating disc member provided with a wrist pin, said pin engaging in a slot in the cross-head clamp and a plurality of guide bars slidably receiving and extending through the cross-head clamp so that rotation of the disc member reciprocates the cross-head clamp on the guide bars.

5. A power hand tool comprising in combination a casing, a work tool, a reciprocable tool clamp located in the casing for receiving the end of the tool, a guide in the casing for the tool clamp, a prime mover, and power transmitting means for connecting the tool clamp and the prime mover, said guide comprising a plurality of guide bars supported at their ends by uprights, the guide being proportioned to fit snugly within the casing and the guide bars slidably receiving the tool clamp, said tool clamp comprising two co-acting members, the one member carrying bolts, rectangular tool holding lugs and projecting members, the other member of the clamp having sockets for receiving the bolts, rectangular apertures for receiving the lugs and guiding grooves for receiving the projecting members, whereby the tool end can be securely clamped between the two co-acting members and held in rigid alignment.

6. A power hand tool comprising in combination a casing, a work tool, a reciprocable tool clamp located in the casing for receiving the end of the tool, a guide in the casing for the tool clamp, a prime mover, and power transmitting means for connecting the tool clamp and the prime mover, said guide comprising a plurality of guide bars supported at their ends by uprights, the guide being proportioned to fit snugly within the casing and the guide bars slidably receiving the tool clamp, said tool clamp comprising two co-acting members, the one member carrying bolts, rectangular tool holding lugs and projecting members, the other member of the clamp having sockets for receiving the bolts, rectangular apertures for receiving the lugs and guiding grooves for receiving the projecting members, whereby the tool end can be securely clamped between the two co-acting members and held in rigid alignment, and said guide comprising a plurality of guide bars supported at their ends by uprights, the whole guide being proportioned to fit snugly within the casing, and the guide bars projecting through and slidably receiving the tool clamp.

In testimony whereof, I have signed my name to this specification.

HERBERT LUSTIG.